United States Patent
Kirkpatrick

(10) Patent No.: US 11,785,914 B2
(45) Date of Patent: Oct. 17, 2023

(54) ENCLOSED LITTER BOX

(71) Applicant: Nickey Lee Kirkpatrick, Waco, TX (US)

(72) Inventor: Nickey Lee Kirkpatrick, Waco, TX (US)

( * ) Notice: Subject to any disclaimer, the term of this patent is extended or adjusted under 35 U.S.C. 154(b) by 0 days.

(21) Appl. No.: 17/647,405

(22) Filed: Jan. 7, 2022

(65) Prior Publication Data
US 2023/0217886 A1 Jul. 13, 2023

(51) Int. Cl.
*A01K 1/01* (2006.01)
*A01K 1/00* (2006.01)

(52) U.S. Cl.
CPC .......... *A01K 1/0107* (2013.01); *A01K 1/0052* (2013.01)

(58) Field of Classification Search
CPC .. A01K 1/0107; A01K 1/0052; A01K 1/0047; A01K 1/033
See application file for complete search history.

(56) References Cited

U.S. PATENT DOCUMENTS

| | | | | |
|---|---|---|---|---|
| 3,861,356 A * | 1/1975 | Kulka | ...................... | A01K 1/033 119/497 |
| 4,411,156 A * | 10/1983 | Lowe | .................. | G01N 33/0001 73/866 |
| 5,329,878 A * | 7/1994 | McCauley | ........... | A01K 1/0107 119/673 |
| 5,655,478 A | 8/1997 | Kiera | | |
| 5,778,822 A | 7/1998 | Giffin | | |
| 5,806,461 A | 9/1998 | Kiera | | |
| 6,209,490 B1 * | 4/2001 | Schwede | .............. | A01K 1/0236 119/472 |
| 6,463,881 B2 | 10/2002 | Reitz | | |
| 6,637,374 B2 * | 10/2003 | Hawks | ................... | A01K 1/034 119/493 |
| 6,659,045 B2 | 12/2003 | Thompson | | |
| 6,945,193 B1 * | 9/2005 | Tanner | ................. | A01K 1/0107 119/165 |
| 7,051,679 B2 * | 5/2006 | Bello | ..................... | A01K 1/033 119/482 |
| D554,303 S * | 10/2007 | Linehan | ...................... | D6/675.3 |
| 7,320,295 B2 | 1/2008 | Ehrreich | | |
| 7,635,401 B2 * | 12/2009 | Dietz | ................... | F24F 1/0071 55/467 |
| 8,733,286 B2 | 5/2014 | Sweetman | | |

(Continued)

FOREIGN PATENT DOCUMENTS

| | | | | |
|---|---|---|---|---|
| KR | 20180010459 A | | 1/2018 | |
| WO | WO-2006041836 A1 | * | 4/2006 | .......... A01K 1/0107 |
| WO | WO2017/007625 | | 1/2018 | |

OTHER PUBLICATIONS

Fan Equipment Co. Inc, Meowthouse, Brochure, Feb. 18, 2004, online meowthouse.com.

*Primary Examiner* — Ebony E Evans

(57) ABSTRACT

An enclosed litter box is provided that includes a housing sized and shaped for an animal and litter tray. The apparatus includes a self-closing door that impedes airflow between the interior and exterior of the housing and can be utilized by an animal as an entrance and exit to the housing. The apparatus further includes a recirculation ventilation system that includes a fan to draw air from the interior of the housing through a filter and then circulate the filtered air back into the interior of the housing. This filter is configured to remove odor from the air.

15 Claims, 6 Drawing Sheets

(56) References Cited

U.S. PATENT DOCUMENTS

| | | | |
|---|---|---|---|
| 8,881,680 B1 | 11/2014 | Woody | |
| 9,504,228 B1* | 11/2016 | Ciotic | A01K 1/0052 |
| 9,713,315 B2 | 7/2017 | Sweetman | |
| 9,961,875 B2 | 5/2018 | Goddard | |
| 10,709,103 B1* | 7/2020 | Kinsey | F25D 17/06 |
| 10,729,096 B2 | 8/2020 | Orgias | |
| D897,055 S | 9/2020 | Goddard / Imel | |
| 2003/0075115 A1* | 4/2003 | Thompson | A01K 1/033 119/482 |
| 2005/0076844 A1* | 4/2005 | Lakela | A01K 1/0107 119/165 |
| 2006/0196439 A1* | 9/2006 | Chilcoat | A01K 1/011 119/165 |
| 2008/0053379 A1* | 3/2008 | Markewitz | A01K 13/00 119/600 |
| 2011/0259275 A1* | 10/2011 | Mynatt | A01K 1/0114 119/166 |
| 2014/0069342 A1 | 3/2014 | Khalili | |
| 2017/0000163 A1* | 1/2017 | Grajcar | A01K 39/00 |
| 2019/0357495 A1* | 11/2019 | Liu | A01K 29/00 |
| 2022/0046889 A1* | 2/2022 | Oldencamp | A01K 1/0107 |

\* cited by examiner

ENCLOSED LITTER BOX

TECHNICAL FIELD

The present disclosure relates to waste disposal systems for animals, and more particularly, to litter box systems for animals.

BACKGROUND

Litter boxes are used by pet owners to allow their pets to urinate and defecate in a particular area for easier cleanup. Most litter boxes are trays that contain animal litter and are manually cleaned by the pet owner.

Many litter boxes have the issue that animals often spill litter onto the floor as they use the litter box.

Litter boxes, as places where animal waste products are often present, are associated with foul odors.

SUMMARY

In accordance with the present invention, an enclosed litter box system is provided, which substantially eliminates or reduces disadvantages and problems associated with previous systems and methods.

In accordance with one embodiment, an enclosed litter box includes a housing sized and shaped for an animal and litter tray. The apparatus includes one or more self-closing doors that an animal can use as an entrance or exit to the housing and impedes airflow between the interior and exterior of the housing. The apparatus further includes a recirculation ventilation system that includes a fan to draw air from the interior of the housing through a filter and then circulate the filtered air back into the interior of the housing. These filters can be configured to remove odors from the air.

More specifically, certain embodiments may also include a removable litter tray configured to rest at a bottom of the interior of the housing, and certain embodiments may also include a panel on a side of the housing configured to allow easy removal of the litter tray.

Certain embodiments may also include a second self-closing door providing egress from the housing, so the first self-closing door, the second self-closing door, and the housing are configured to impede airflow between the interior of the housing and the external environment outside the housing. The first self-closing door is a one-way door that provides entry into the housing and prevents exit from the housing, and the second self-closing door is a one-way door providing exit from the housing and preventing entrance to the housing.

In certain embodiments, one or more controls may be configured to activate an interior light to illuminate the interior of the housing. In certain embodiments, the interior light may comprise a blacklight.

In certain embodiments, one or more controls may be configured to activate the recirculating ventilation system. Certain embodiments may also include a recirculating ventilation system automatically activated by at least one of a timer, a weight sensor, and a motion sensor.

Certain embodiments may also include a ramp pathway comprising a plurality of openings sized and shaped to permit debris to pass through, where the pathway is positioned over a bottom of the interior of the housing such that the debris falls into a litter tray area located at the bottom of the interior of the housing. The pathway may comprise at least one ramp angled to spread the paws of the animal walking on the pathway to dislodge debris. For the purposes of this specification, "paws" include any kind of animal foot or appendage. In certain embodiments, the plurality of openings may be sized and shaped to dislodge debris from the paws of the animal.

In certain embodiments, the pathway may comprise an incline ramp and a decline ramp, where both the incline ramp and the decline ramp are angled to spread the paws of the animal walking on the pathway to dislodge debris. The pathway may be positioned between the litter tray area located at the bottom of the interior of the housing and the second self-closing door, such that the first self-closing door, the litter tray area, the pathway, and the second self-closing door define a path the animal must traverse to enter and exit the enclosed litter box. In certain embodiments, the pathway may comprise a guard configured to impede the animal from bypassing a portion of the path before exiting the enclosed litter box.

In accordance with another embodiment, a litter box that comprises a housing sized and shaped for an animal and a litter tray, a first one-way self-closing door providing entry into the housing, and a second one-way self-closing door providing an exit from the housing. The first one-way self-closing door, the second one-way self-closing door, and the housing are configured to substantially eliminate airflow between an interior of the housing and an external environment outside the housing when the first one-way self-closing door and the second one-way self-closing door are both closed. The embodiment further comprises a pathway positioned between a litter tray area located at a bottom of the interior of the housing and the second one-way self-closing door, such that the first one-way self-closing door, the litter tray area, the pathway, and the second one-way self-closing door define a path the animal must traverse to enter and exit the litter box. The pathway further comprises a surface with a plurality of openings sized and shaped to dislodge debris from paws of an animal walking on the pathway, and the pathway is positioned over the bottom of the interior of the housing such that dislodged debris can fall into the litter tray area located at the bottom of the interior of the housing. The embodiment also includes a recirculating ventilation system that comprises a fan configured to draw air from the interior of housing through a filter and to circulate filtered air back into the interior of the housing, wherein the filter is configured to remove odor from the air.

More specifically, certain embodiments may include the pathway comprising at least one of an incline ramp and a decline ramp, each of the incline ramp and the decline ramp angled to spread the paws of the animal walking on the pathway to dislodge debris. The angle of the inclined ramp may be configured to dislodge debris from the feet of the animal as it traverses the pathway.

In accordance with another embodiment, a litter box that comprises an enclosure comprising a plurality of panels, a bottom panel configured to support a litter tray containing animal litter, a ceiling, a one-way entrance door situated in a first panel of the enclosure, a one-way exit door situated in a second panel of the enclosure, and a pathway comprising an inclined ramp situated between the floor area and the one-way exit door. The one-way entrance door, the floor, the pathway, the ramp, and the one-way exit door comprise a path an animal must traverse to enter and exit the apparatus. The pathway comprises a surface having one or more openings configured to dislodge animal litter from the paws of the animal and allow the animal litter to fall through the openings to the floor area as the animal traverses the pathway en route to the one-way exit door. This embodiment further comprises a recirculating ventilation system configured to intake a volume of air from within the enclosure, filter the volume of air to remove odor, and vent filtered air back into the enclosure. The one-way entrance door and one-way exit door, the plurality of panels, the top door, and the bottom panel contain a volume of air that is substantially separate from ambient air surrounding the enclosure when the one-way entrance door and the one-way exit door are closed.

More specifically, in certain embodiments the first panel and the second panel may be the same panel.

Accordingly, various embodiments have the important aspects of reducing foul odors outside of the enclosure from animal excrement inside of the enclosure. Embodiments may result in decreased spillage of litter outside of the litter boxes than prior solutions. This could be advantageous for those who wish to have litter box systems inside of houses, as it would reduce the need for cleaning up litter.

DETAILED DESCRIPTION

Figure 1:
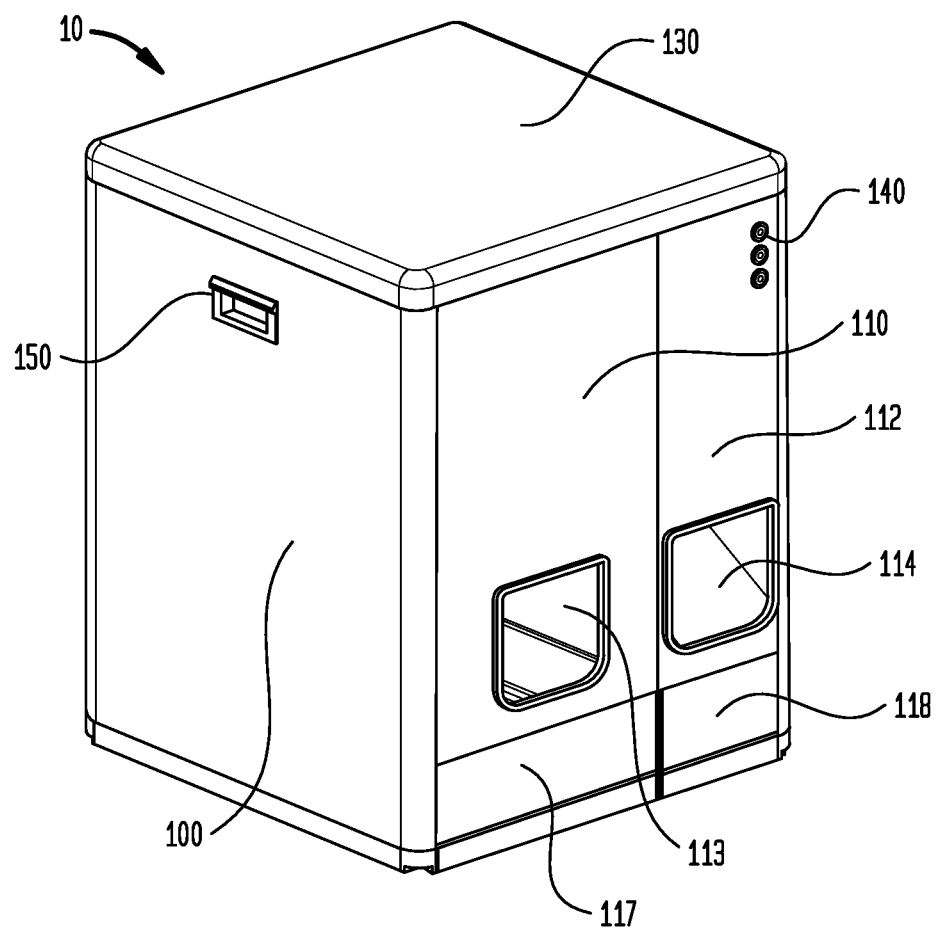
FIG. 1 illustrates an embodiment of an enclosed litter box that depicts the outside of an enclosure in accordance with this specification.

FIG. 1 depicts an embodiment of an enclosed litter box 10. The enclosed litter box 10 comprises an enclosure that is sized and shaped to allow an animal, such as a cat, to enter, use a conventional litter box (e.g., comprising a tray and litter) housed within the enclosure, and exit on its own accord. The enclosed litter box 10 can be made of any suitable materials and, although the illustrated embodiment is a six-sided cuboid, alternative embodiments may be shaped and sized differently.

In the illustrated embodiment, enclosed litter box 10 comprises a plurality of panels such as left side panel 100. A first subpanel 110 of a front face of the enclosure includes animal entrance 113. A second subpanel 112 of front face includes animal exit 114. In one embodiment, first subpanel 110 and second subpanel 112 are fabricated separately and are coupled together to form portions of a front-facing panel. In another embodiment, first subpanel 110 and second subpanel 112 are integrated parts of a single front-facing panel. Animal entrance 113 and animal exit 114 are sized and shaped to permit an ordinary house cat to enter and exit the enclosed litter box 10 respectively. Animal entrance 113 and animal exit 114 may include self-closing doors and may open and close manually (e.g., hanging on a gravity hinge) or in an automated fashion (e.g., electronically controlled and/or activated by motion sensors). In the illustrated embodiment, animal entrance 113 and animal exit 114 include self-closing swinging doors configured to enable one-way access so that the doors remain closed when not in use, and an animal must enter enclosed litter box 10 through animal entrance 113 and exit through animal exit 114. For instance, animal entrance 113 may include a door mounted via a gravity hinge and mounted on an inside portion of the first subpanel 110 of the front face so that it swings open only into enclosed litter box 10 and swings closed naturally. Analogously, animal exit 114 may include a door mounted to an outside portion of second subpanel 112 via a gravity hinge to swing away from enclosed litter box 10 and swing closed naturally. This self-closing, one-way functionality may be provided by any suitable combination of hinges, mounting placement, and specially sized and shaped components. Other embodiments may use different mechanisms to facilitate one-way opening and closing. Alternative embodiments may include a single opening to permit both entry and exit of an animal with a self-closing door.

Figure 2:
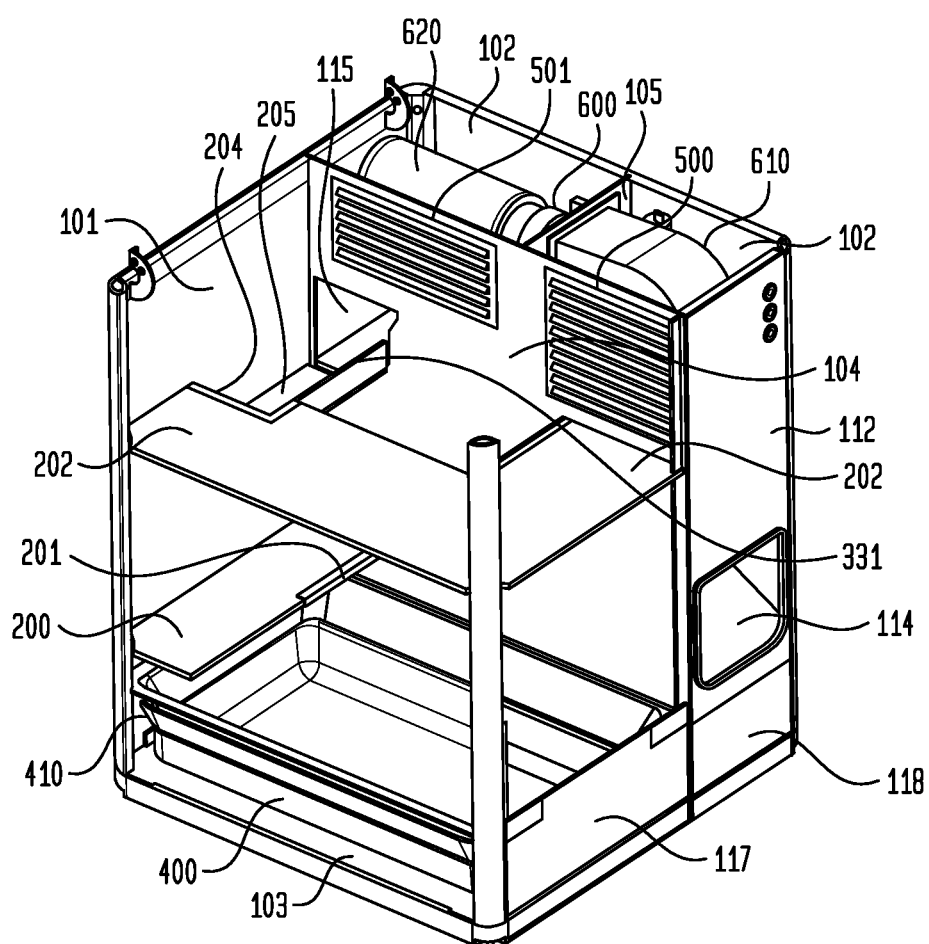
FIG. 2 illustrates an embodiment of a litter box that depicts the inside of the enclosure with the one-way pathway and litter box in accordance with this specification.

Below the first subpanel 110 is a first litter door panel 117 that runs across a bottom portion of the front face of enclosed litter box 10. The first litter door panel 117 may be configured as a movable (e.g., sliding or swinging) panel. In one embodiment, first litter door panel 117 is configured to slide vertically (rise) toward or into first subpanel 110. First litter door panel 117 may be lifted to allow a person to easily and quickly access a removable litter tray (as shown in FIG. 2) located on the floor inside enclosed litter box 10 for ease of changing litter. In other embodiments, first litter door panel 117 may be hingedly connected to enclosed litter box 10 to open and permit internal access.

Figure 3:
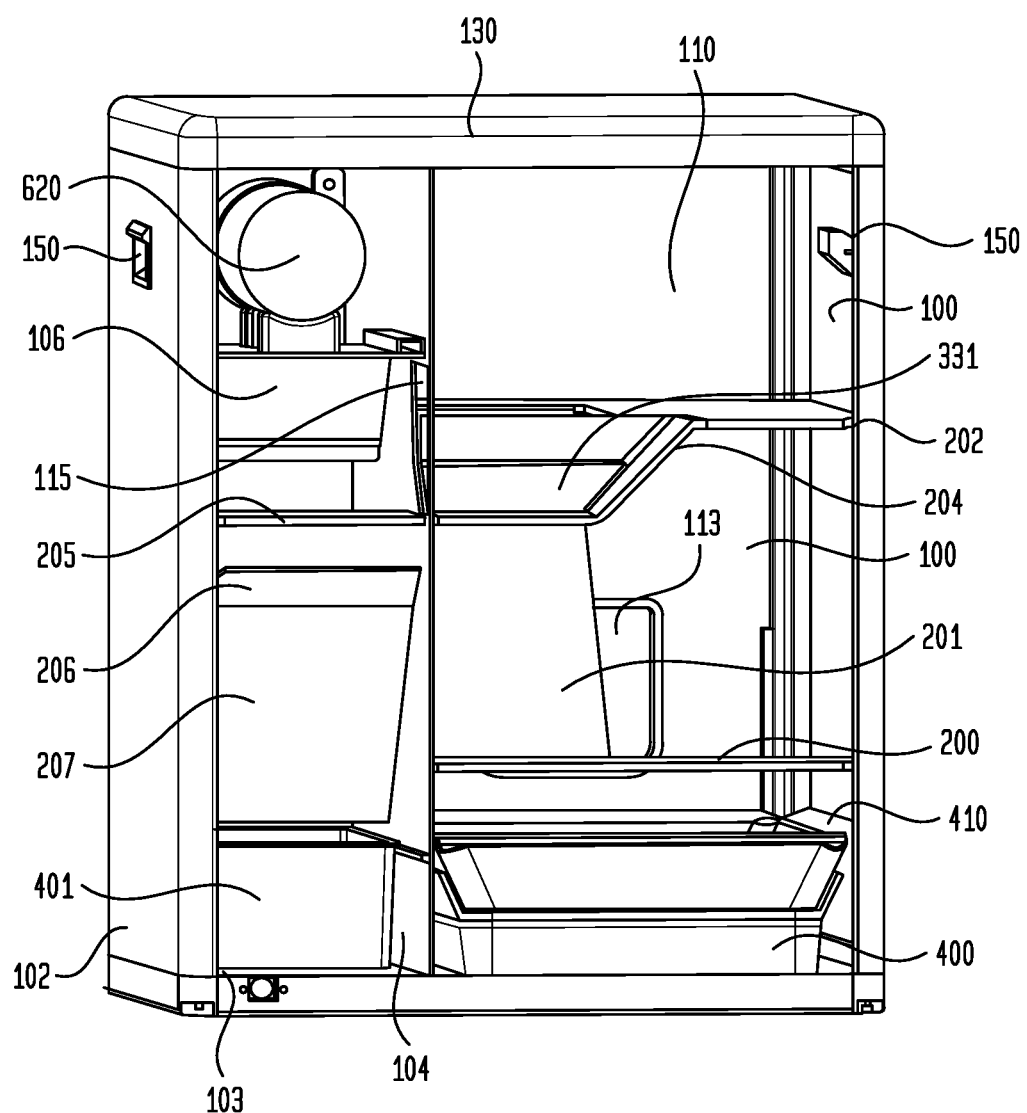
FIG. 3 illustrates an embodiment of a litter box that depicts the inside of the enclosure and pathway from a rear perspective in accordance with this specification.

Below the second front subpanel 112 is a second litter door panel 118 that runs across another bottom portion of the front face of enclosed litter box 10. The second litter door panel 118 may be configured as a movable (e.g., sliding or swinging) panel. In one embodiment, second litter door panel 118 is configured to slide vertically (rise) toward or into second front subpanel 112. Second litter door panel 118 may be lifted to allow a person to easily and quickly access an exit litter tray (as shown in FIG. 3) located on the floor inside enclosed litter box 10 for ease of emptying the exit litter tray. In other embodiments, second litter door panel 118 may be hingedly connected to enclosed litter box 10 to allow internal access. Second front subpanel 112 includes a control interface 140. In some embodiments, control interface 140 is located on top door 130.

Top door 130 is generally mounted to one or more other panels of the enclosed litter box 10 to permit access to the inside of the enclosure 10. In some embodiments, top door 130 may be hingedly connected to one of the side panels of litter box 10, such as a back side panel (See FIG. 2). In other embodiments, top door 130 is configured to secure to enclosed litter box 10 by friction, clasps, interfacing magnets, interlocking components, or some other securing mechanism.

In certain embodiments, a front facing panel (e.g., second subpanel 112, shown here) includes a control interface 140. Control interface 140 includes interface components (e.g., buttons, dials, displays, touchscreens, etc.) to control various features (e.g., lights, fans, motion sensors, etc.) associated with enclosed litter box 10. For example, certain embodiments may include a UV lamp and incandescent lamp mounted internally within enclosed litter box 10 (not shown), and controls 140 may be configured to turn them on or off, and/or configure timers or settings related to lighting, fans, or sensors. In other embodiments, features such as circulation/filtration fans may be operated by timers or sensors controlled by control interface 140.

FIG. 2 depicts the inside of a litter box enclosure 10 according to certain embodiments. Enclosed litter box 10 includes several features including a recirculating ventilation system, and a directional ramped pathway configured to dislodge litter from an animal's paws as it traverses the path to exit.

Shown in FIG. 2 are back side panel 101, right side panel 102, main bottom panel 103, main dividing panel 104, second front subpanel 112, first litter door panel 117, second litter door panel 118, animal exit 114, and a directional ramped pathway between entrance 113 and exit 114 comprising lower level 200, incline ramp 201, upper level 202, decline ramp 204, and egress 205. Also illustrated in FIG. 2 are guard rail upper 331, removable litter tray 400, splash guard 410, inflow vent 500, outflow vent 501, filter connector tube 600, fan assembly 610, and air filter assembly 620.

In this embodiment, right side panel 102 is coupled to back side panel 101 and second front subpanel 112. Back side panel 101 and first subpanel 110 are coupled to left side panel 100 on one side. Right side panel 102, back side panel 101, and second front subpanel 112 are coupled underneath by main bottom panel 103 and configured to form an enclosure. Main dividing panel 104 is coupled to back side panel 101 and edges of first and second subpanels 110 and 112 so that main dividing panel 104 is perpendicular to the back side panel 101 and the coupled first and second subpanels 110 and 112. Main dividing panel 104 is coupled above main bottom panel 103. Main dividing panel 104 is coupled to inflow vent 500 and outflow vent 501. Back side panel 101, right side panel 102, main dividing panel 104, and coupled first and second front-facing subpanels 110 (as shown in FIG. 1) and 112 are coupled to top door 130. Removable litter tray 400 is configured to rest on top of main bottom panel 103 and align with a splash guard 410 when placed in enclosed litter box 10. Splash guard 410 is coupled to left side panel 100, back side panel 101, main dividing panel 104, and first front subpanel 110 and is shaped to funnel or shunt litter and waste into litter tray 400.

Figure 4:
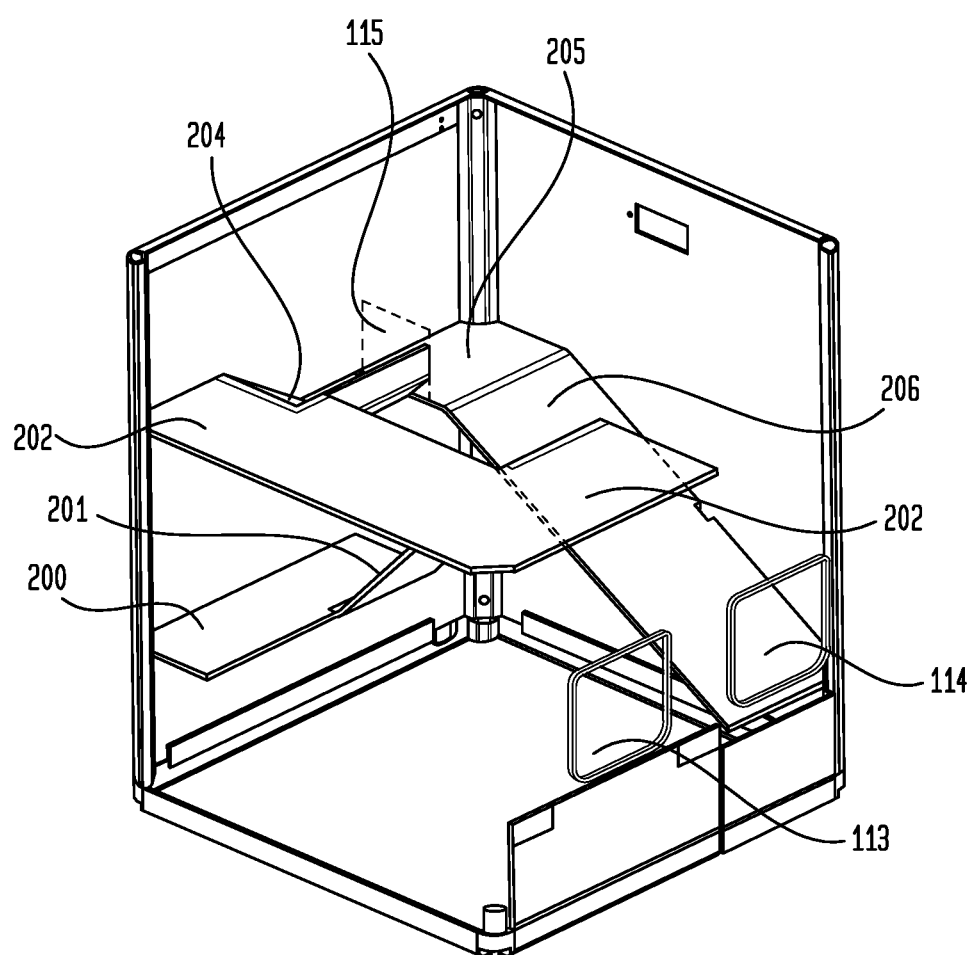
FIG. 4 illustrates an embodiment that depicts a one-way pathway in accordance with this specification.

Once the animal enters through the animal entrance 113, it will enter directly onto the removable litter tray 400. The animal will then traverse the directional ramped pathway system 200-206 (as shown in FIG. 4) to exit enclosed litter box 10. A person can open the first litter door panel 117 to easily remove and clean the removable litter tray 400.

Components of the recirculating ventilation system shown in FIGS. 2 and 3 include filtration dividing panel 105, filtration system bottom panel 106 (as shown in FIG. 3), inflow vent 500, outflow vent 501, filter connector tube 600, fan assembly 610, and air filter assembly 620. Disposed between inflow vent 500 and fan assembly 610 is an additional filtration system, comprising intake filter housing 602 and intake filter 604, further disclosed and discussed in connection with FIG. 6.

Air filter assembly 620 is located on the filtration system bottom panel 106 and is coupled to a fan assembly 610 by a filter connector tube 600. Fan assembly 610 includes a fan configured to intake air via the assembly via inflow vent 500 and exhaust through air filter assembly 620 and outflow vent 510 so as to filter and recirculate air in the interior of enclosed litter box 10. Fan assembly 610 is capable of displacing air at a rate sufficient to circulate and filter air within the enclosure to remove odors. In some embodiments, the fan is capable of circulating air at at least 60 cubic feet per minute (cfm). In other embodiments, the fan is capable of circulating air at over 100 cfm, and may be in the range of 130-150 cfm. In yet other embodiments, the fan has a sone level below 1 sone, and may be in the range of 0.3-0.5 sones. An example of a fan suitable in some embodiments is a Panasonic WhisperChoice 0.3-Sone 150-CFM bathroom fan.

When the fan is in operation, the fan forces air from a first side of enclosed litter box 10 where the litter tray 400 sits through inflow vent 500, through initial intake filter, fan assembly 610, filter connector tube 600, and air filter 620. Air filter 620 filters the air passing through it to remove odors. In certain embodiments, air filter 620 may comprise a carbon filter, such as a charcoal filter, to remove odors. An example of a charcoal filter suitable in some embodiments is an AC Infinity Air Carbon Filter 10" with Premium Australian Virgin Charcoal. Filtered air then moves through the outflow vent 501 back into the first side of the enclosed litter box 10 where litter tray 400 sits. The particular fan speed and filter type may vary in different embodiments based on, for example, the volume of air in the enclosure and intended use.

In some embodiments, the fan assembly 610 may be configured to operate continuously. In other embodiments, the fan assembly 610 may be configured to operate on a time delay (which may be controlled via interface 140). As examples, the fan assembly may be programmed to alternate between operating for 10-20 minutes (e.g., 15 minutes) and powering off for 45-115 minutes (e.g., 60 minutes). This time delay feature enhances the user's options for controlling the fan assembly 610.

As noted above, animal exit 114 and animal entrance 113 may include self-closing doors. These doors may be configured to inhibit or substantially eliminate air flow into or out of enclosed litter box 10 when closed, thereby preventing odors from escaping. For example, the doors may be weighted, may be mounted in a manner so as to sit flush with the adjacent panel, and/or may include a sealing material along the edge (e.g., rubber) to enhance the seal between the door and panel face. Moreover, movement of air within enclosed litter box 10 through the recirculating ventilation system described above will remove the odors from air inside the enclosure. These and other features of enclosed litter box 10 provide a system for managing odors associated with animal litter.

FIG. 3 depicts another inside view of enclosed litter box 10 from a rear perspective according to certain embodiments.

The entire enclosed litter box 10 can be moved by a person with one or more carry handles 150 coupled to the left side panel 100 and right side panel 102. Carry handle 150 is sized and shaped to allow a person to use at least one hand to move the enclosure. Additional carry handles may be on other sides. Some embodiments may include UV lamp and incandescent lamp (not shown) mounted the underside of top panel 130 and pointed downward to illuminate the inside of the enclosure. These can be turned on with the control interface 140. These lights allow visibility for the animal inside the enclosure and allows a person to more easily see to clean the enclosure. These can be substituted for other types of lights in other embodiments. In other embodiments, lights may be motion activated or controlled via a timer, and may be mounted in other locations within the enclosure.

FIG. 4 depicts the directional ramped pathway between entrance 113 and exit 114 noted above that the animal may take as it moves through the enclosed litter box 10. In operation, an animal such as a cat enters enclosed litter box 10 through entrance door 113 and steps into removable litter tray 400. Entrance door 113 is a one-way door that does not permit exit, so after using the litter, the animal begins to exit by stepping onto lower level 200. The animal then climbs incline ramp 201, traverses upper level 202, walks down decline ramp 204, traverses egress 205 (through dividing panel opening 115), and down decline exit ramp 206, in sequence to reach exit 114 (which includes a one-way exit door as described above). One or more guard rails (e.g., guard rail 331 shown in FIGS. 2 and 3) prevents smaller animals from skipping portions of the path (e.g., by jumping upwards). In this manner, features of enclosed litter box 10 define a directional path through which an animal is forced to traverse.

Figure 5B:
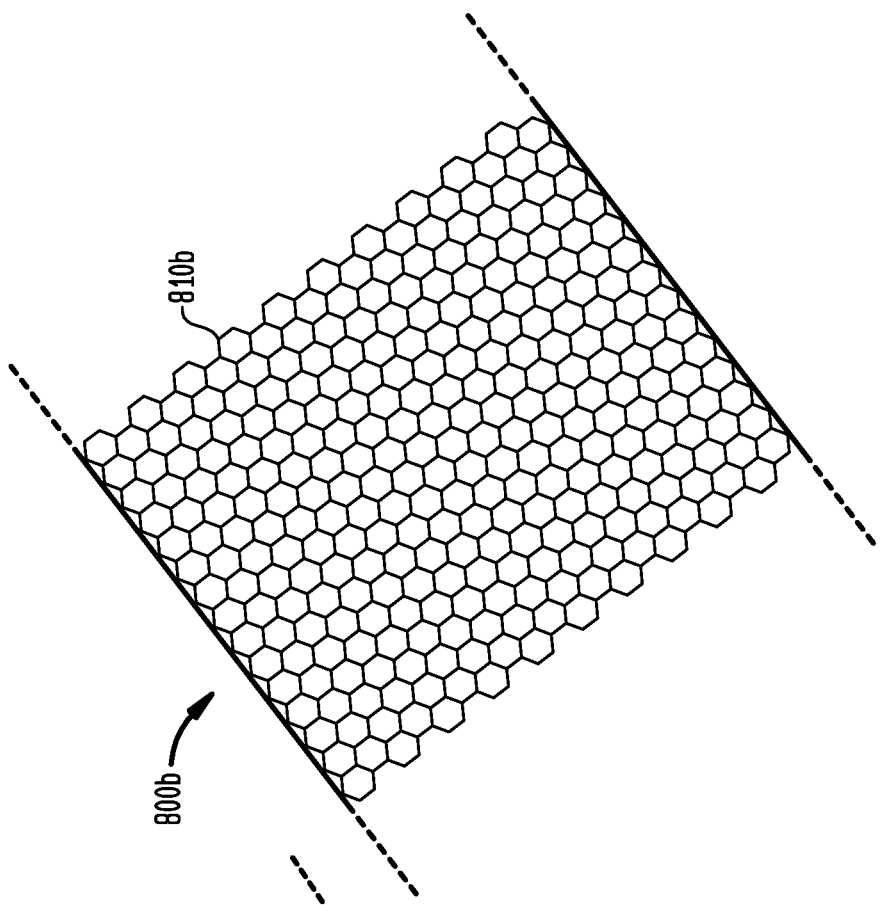
FIGS. 5a and 5b illustrate embodiments of a grate having square and honeycomb openings, respectively.
Figure 5A:
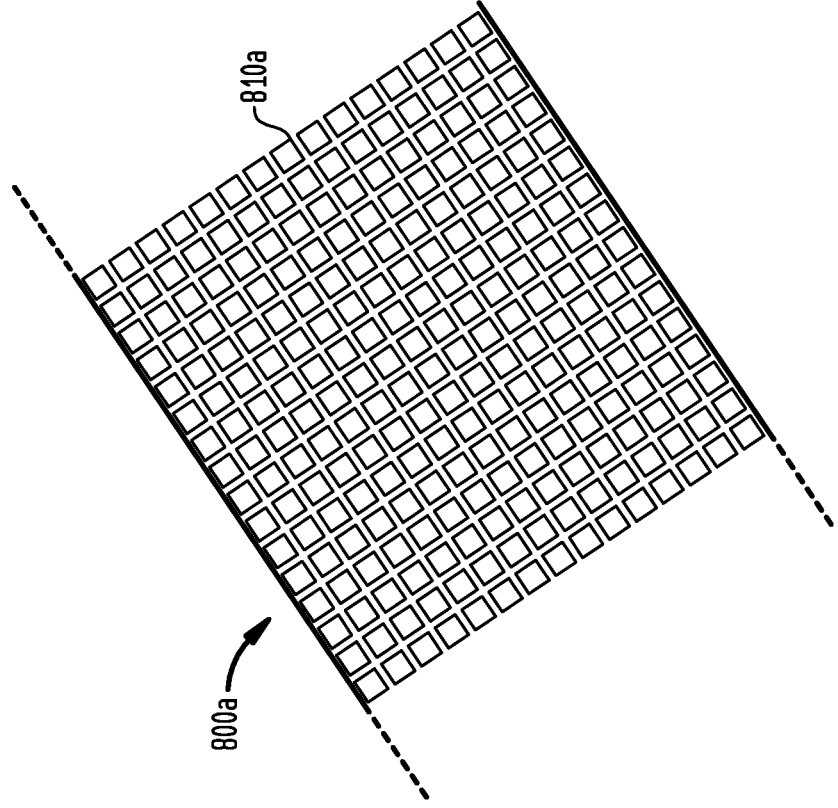

One or more components 200-206 of the directional ramped pathway may comprise a grate or other structure with openings sized and shaped to permit particulate matter (such as litter) attached to the animal's feet or paws to fall through to the floor of the enclosure while providing adequate support for the animal as it walks. FIGS. 5A and 5B illustrate two example grates according to certain embodiments. In particular, grate 800a may include a square pattern, with square openings 810a. In other embodiments, a grate 800b may include a honeycomb pattern, with honeycomb openings 810b. The openings 810a or 810b may be sized and shaped to dislodge cat litter on an animal's paws as it traverses the grate and further permit litter to pass through toward the bottom of enclosure 10. In some embodiments, the openings 810a or 810b may be about one quarter of an inch wide or about one eighth of an inch wide. The grate or other structure 800a or 800b may be fabricated from any suitable material such as plastic, metal, or wood.

Components of the directional ramped pathway (e.g., incline ramp 201, decline ramp 204, egress 205) can be angled so that, as an animal traverses the incline or decline, digital pads on its paws are spread or extended in a manner that helps dislodge particulate matter (such as litter) attached to the animal's paws. Additionally, including ramps in the design of the directional path permits extending the length of the pathway within the enclosure. Increasing the distance of the pathway increases the number of steps the animal takes on the grate, thereby dislodging more particulate matter. In some embodiments, the incline and/or decline ramps may be angled above 30 degrees. For example, the ramps may be angled at 35 or 45 degrees in certain embodiments. This can help dislodge litter from the paws of an animal traversing the ramps as noted above, while avoiding inclines so steep that the animal may resist walking up/down them (e.g., by leaping across or over portions of the grate).

As shown in the figures, most components of the directional ramped pathway are situated over litter tray 400 and/or splash guard 410 such that dislodged particulate matter (such as litter) falling off the animal's paws is captured by these components before the animal exits. Additionally, litter slide/ramp 207, shown in FIG. 3, is located underneath the decline exit ramp 206 to cause litter to fall into the exit litter tray 401. These structural features provide a system that passively removes particulate matter attached to the feet or paws of an animal while it is within the interior of enclosed litter box 10, thereby reducing or preventing mess around and outside enclosed litter box 10. Moreover, this benefit is enhanced by the enclosed design of enclosed litter box 10, which makes it possible to utilize a one-way entrance and exit and grated structures to define a directional path.

Figure 6:
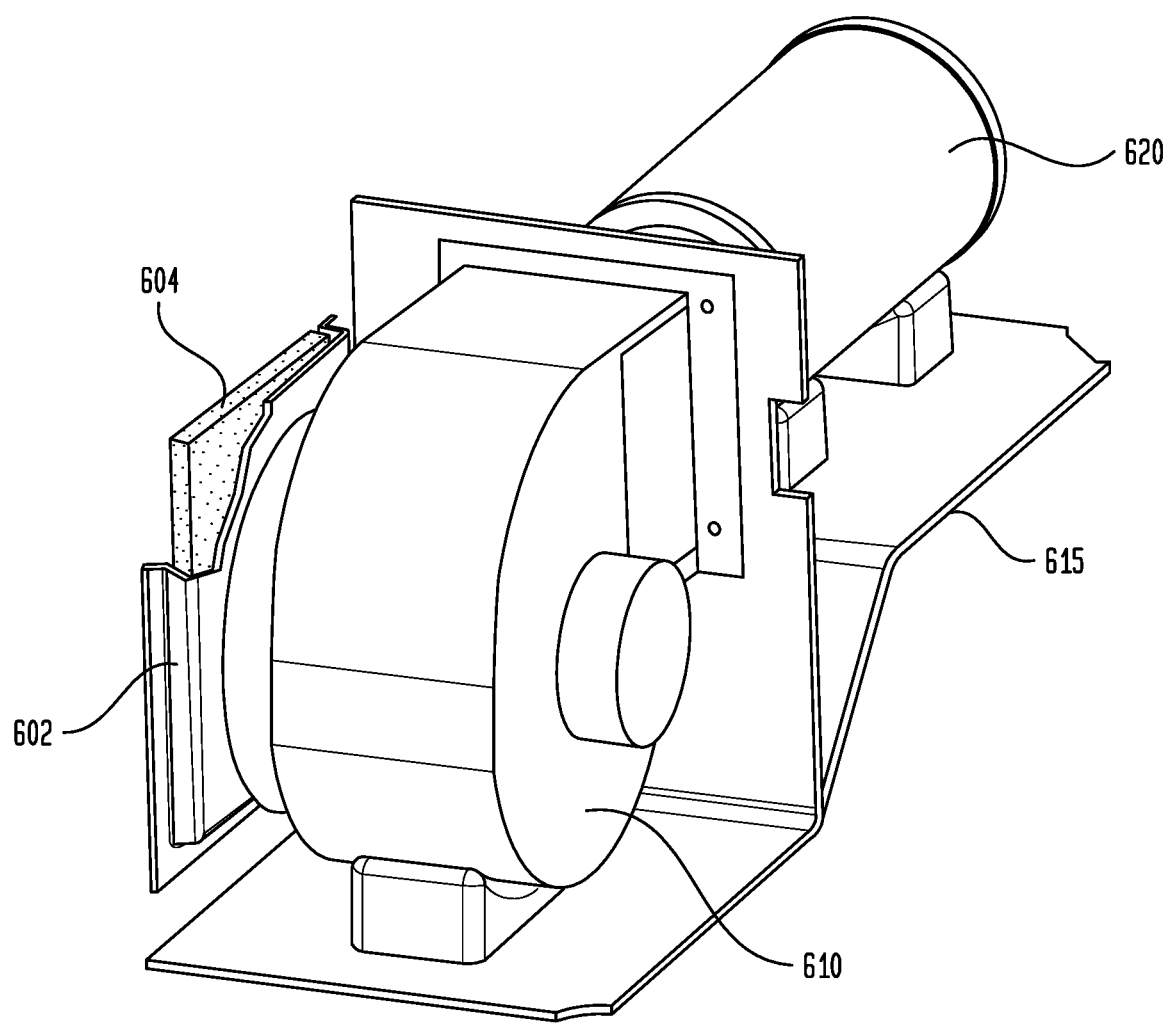
FIG. 6 illustrates one aspect of an air filtration system in accordance with this specification.

FIG. 6 illustrates additional aspects of the air filtration system discussed in FIGS. 2 and 3. Disposed between inflow vent 500 (shown in FIGS. 2 and 3) and fan assembly 610 is an additional filtration system, comprising intake filter housing 602 and intake filter 604, further disclosed and discussed in connection with FIG. 6. Fan assembly 610 and charcoal filter 620 are seated on filter platform 615. Although many forms of cat litter are advertised as being dust free or having a limited amount of dust, a substantial amount of dust may be present in the interior of enclosed litter box 10. While the filtration system provided by the charcoal filter of filtration system 620 may be effective, the filtration system is made more efficient by providing a disposable coarse filter (604) between the inflow vent and the fan assembly. In this manner, intake filter 604 can capture a substantial amount of dust in the system, both enhancing the overall filtration of the system and extending the life of filtration system 620 and fan components included in fan assembly 610. In one embodiment, intake filter 604 is 8 in.×8 in.×1 in. Filter housing 602 may contain an opening disposed at the top of the housing to allow intake filter 604 to be inserted. (In FIG. 6, filter housing 602 also depicts a cutaway for illustration purposes to more clearly show intake filter 604.) In this way, a user may open the top of enclosed litter box 10, remove intake filter 604, and replace it with a new filter as desired. As would be apparent to one of skill in the art, other ways of providing mechanical access to intake filter 604 may be possible.

Accordingly, an enclosed litter box 10 according to the disclosure provides several synergistic structural features that help manage odor and mess associated with animal litter. The interior of enclosed litter box 10 provides an environment for recirculated air filtering that removes odors associated with the litter without exhaust venting to ambient air, as well as a structure within which a directional path can be defined and utilized to passively dislodge litter from the animal's feet and reduce or eliminate litter tracked outside the litter box.

Although the present invention has been described in detail, it should be understood that various changes, substitutions and alterations can be made without departing from the spirit and scope of the invention as defined by the appended claims. Although a particular arrangement of doors, paths, and ramps is illustrated, it will be appreciated that alternative embodiments could have different path configurations and components.

The invention claimed is:

1. A enclosed litter box, comprising:
   a housing sized and shaped for an animal and a litter tray;
   a removable litter tray configured to rest at the bottom of the interior of the housing;
   a first self-closing, one-way door providing entry into the housing;
   a second self-closing, one-way door providing exit from the housing;
   the first self-closing, one-way door, the second self-closing, one-way door, and the housing being configured to impede airflow between the interior of the housing and an external environment outside the housing;
   an exit ramp comprising a plurality of openings sized and shaped to permit debris to pass through, the exit ramp positioned on one side of an internal dividing panel in the interior of the housing so that the animal must walk down the exit ramp to reach the second self-closing, one-way door;
   an aperture disposed on said internal dividing panel near the top of the exit ramp; wherein the first self-closing one way door and second self-closing one-way door are on opposite sides of the dividing panel;
   a secondary tray configured to rest under the exit ramp at the bottom of the interior of the housing;
   a recirculating ventilation system comprising:
   a fan configured to draw air from the interior of the housing through a filter and to exhaust the filtered air directly back into the interior of the housing, wherein the filter is configured to remove odor from the air.

2. The enclosed litter box of claim 1, further comprising: one or more controls configured to activate one or more interior lights to illuminate the interior of the housing.

3. The enclosed litter box of claim 2, wherein at least one of the interior lights is a blacklight.

4. The enclosed litter box of claim 1, further comprising: one or more controls configured to activate the recirculating ventilation system.

5. The enclosed litter box of claim 1, wherein: the recirculating ventilation system is automatically activated by at least one of a timer, a weight sensor, and a motion sensor.

6. The enclosed litter box of claim 1, further comprising: a walkway comprising:
   a lower platform placed above the removable litter tray;
   an inclined ramp connected at the lower end to the lower platform;
   an upper platform connected to the upper end of the inclined ramp;
   a declined ramp connected at the upper end of the declined ramp to the upper platform;
   an egress platform connected to the lower end of the declined ramp; and
   the exit ramp connected at the upper end of the exit ramp to the egress platform;
   wherein the walkway defines a predetermined non-linear path from the lower platform to the second self-closing, one-way door.

7. The enclosed litter box of claim 6, wherein the lower platform, the inclined ramp, the upper platform, the declined ramp, and the egress platform of the walkway each comprise a plurality of openings sized and shaped to permit debris to pass through and are all positioned over the bottom of the interior of the housing.

8. A enclosed litter box, comprising:
   a housing sized and shaped for an animal;
   a removeable litter tray disposed at the bottom of the housing;
   a first one-way self-closing door providing entry into the housing;
   a second one-way self-closing door providing an exit from the housing;
   wherein the first one-way self-closing door, the second one-way self-closing door, and the housing are configured to substantially eliminate airflow between an interior of the housing and an external environment outside the housing when the first one-way self-closing door and the second one-way self-closing door are both closed;
   a walkway comprising:
   a lower level disposed above the removable litter tray;
   an incline ramp connected at the lower end to the lower level of the walkway;
   an upper level connected to the upper end of the incline ramp;
   a decline ramp connected at the upper end to the upper level;
   an egress platform connected to the lower end of the decline ramp; and
   an exit ramp comprising a plurality of openings sized and shaped to dislodge debris from the feet of the animal which is connected at one end to the egress platform and positioned so that the animal must descend the exit ramp to exit the enclosure;
   wherein the walkway is arranged to force the animal to traverse each component of the walkway to exit the housing;
   a secondary tray positioned under the exit ramp at the bottom of the interior of the housing such that any debris which passes through the plurality of openings falls into the secondary tray;
   a main dividing panel positioned to substantially isolate the exit ramp from the removable litter tray, lower level, incline ramp, upper level, and decline ramp, wherein the egress platform passes through an opening in the main dividing panel; and
   a recirculating ventilation system comprising:
   a fan configured to draw air from the interior of housing through a filter and to exhaust the filtered air back into the interior of the housing, wherein the filter is configured to remove odor from the air.

9. The enclosed litter box of claim 8, wherein: the lower level, the incline ramp, the upper level, the decline ramp, and the first-half of the egress platform is positioned above the removable litter tray;
   the declined exit ramp and second-half of the egress platform is positioned above the secondary tray.

10. The enclosed litter box of claim 8, wherein: the egress platform is coupled with a guard configured to impede the animal from bypassing portions of the walkway.

11. The enclosed litter box of claim 8, wherein: the walkway is positioned between the removable litter tray and the second-self closing, one-way door, such that the first-self closing, one-way door, the walkway, and the second-self closing, one-way door define a route that animal must traverse through to exit the enclosure.

12. The enclosed litter box of claim 8, wherein: the lower level, the incline ramp, the upper level, the decline ramp and the egress platform of the walkway each comprise a plurality of openings sized and shaped to permit debris to pass through.

13. An apparatus, comprising:
   an enclosure comprising:
   a plurality of panels;
   a bottom panel configured to support a litter tray configured to contain animal litter; and
   a ceiling;
   a one-way entrance door situated in a first panel of the enclosure;
   a one-way exit door situated in a second panel of the enclosure; and
   a pathway comprising an inclined ramp situated between a floor area and the one-way exit door
   a constrained path comprising;
   a lower platform displaced above the bottom panel;
   a first ramp connected at the lower end to the lower platform of the constrained path;
   an upper platform connected to the upper end of the first ramp;
   a second ramp connected at the upper end to the upper platform;
   an egress platform connected to the lower end of the second ramp;
   an exit ramp connected at the upper end to the egress platform;
   wherein:
   the one-way entrance door, the constrained path, and the one-way exit door define a route that an animal must traverse to exit the apparatus; and a main dividing panel positioned to substantially isolate the exit ramp from the lower platform, first ramp, upper level, and second ramp, wherein the egress platform passes through an opening in the main dividing panel;
    a recirculating air filtration system configured to:
        intake a volume of air from within the enclosure;
        filter the volume of air to remove odor; and
        exhaust filtered air back into the enclosure;
    wherein the one-way entrance door and one-way exit doors, the plurality of panels, the top door, and the bottom panel contain a volume of air that is substantially separate from ambient air surrounding the enclosure when the one-way entrance door and the one-way exit door are closed.

14. The apparatus of claim 13, further comprising:
a front wall comprising the first panel and the second panel;
the one-way entrance door is situated in the first panel;
the one-way exit door is situated in the second panel.

15. The enclosed litter box of claim 13, wherein:
the lower platform, the incline ramp, the upper platform, the decline ramp and the egress platform of the walkway each comprise a plurality of openings sized and shaped to permit debris to pass through.

* * * * *